Figure 1:
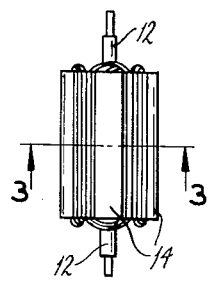

Oct. 30, 1956     L. H. HIRSCH     2,769,104
COOLING DYNAMOELECTRIC MACHINES
Filed July 30, 1953

*INVENTOR.*
LOUIS H. HIRSCH
BY
Rey Eilers
ATTORNEY

United States Patent Office 2,769,104
Patented Oct. 30, 1956

2,769,104

COOLING DYNAMOELECTRIC MACHINES

Louis H. Hirsch, St. Louis, Mo., assignor to Century Electric Company, St. Louis, Mo., a corporation of Missouri Application July 30, 1953, Serial No. 371,363

7 Claims. (Cl. 310—64)

This invention relates to improvements in dynamoelectric machines. More particularly this invention relates to improvements in windings for dynamoelectric machines.

It is therefore an object of the present invention to provide an improved winding for dynamoelectric machines.

Where dynamoelectric machines are made large, the cores of those machines can readily conduct away the heat generated in the windings, and the overall temperature rise of the dynamoelectric machine can be held within acceptable limits. Where however, the dynamoelectric machines are quite small, the cores are hard pressed to conduct away sufficient heat to keep the overall temperature rise of the dynamoelectric machines within acceptable limits. In recognition of this fact, efforts have been made to improve the heat dissipating action of dynamoelectric machines and some of those efforts depended upon the use of heat radiating fins. These fins were customarily made as part of the cores or were mounted on those cores. The difficulty with this type of construction is that when a turn of the winding is insufficiently insulated from the fins, that turn is directly short circuited to the core. Such short circuiting can cause grounding of the entire winding and thus render the dynamoelectric machine inoperative. For these reasons, prior dynamoelectric machines that used fins to cool the windings thereof have been objectionable. The present invention obviates these objections by providing dynamoelectric machines with windings that are cooled by fins, but wherein the fins are electrically isolated from the core. With such a construction, the breakdown of the insulation on one or more turns of the windings cannot short circuit the winding to the core through the medium of one of the fins. It is therefore an object of the present invention to provide a dynamoelectric machine with a winding that has fins that are electrically isolated from the core of that dynamoelectric machine.

The heat radiating fins provided by the present invention are preferably coated with a layer of electrical insulation. In addition, the various turns of the winding are coated with a layer of insulation, and the ends of the fins are physically spaced from the core of the dynamoelectric machine. As a result, the layers of insulation on the turns of the windings coact with the layers of insulation on the fins and with the spacing between the fins and the core to electrically isolate those fins from that core. With such a construction, the breakdown of the insulation on one or more turns of the windings, and one or more of the fins will still not short circuit the entire winding and will not short circuit that winding to the core.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 2:
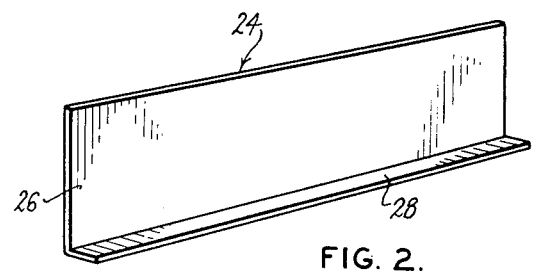
Figure 3:
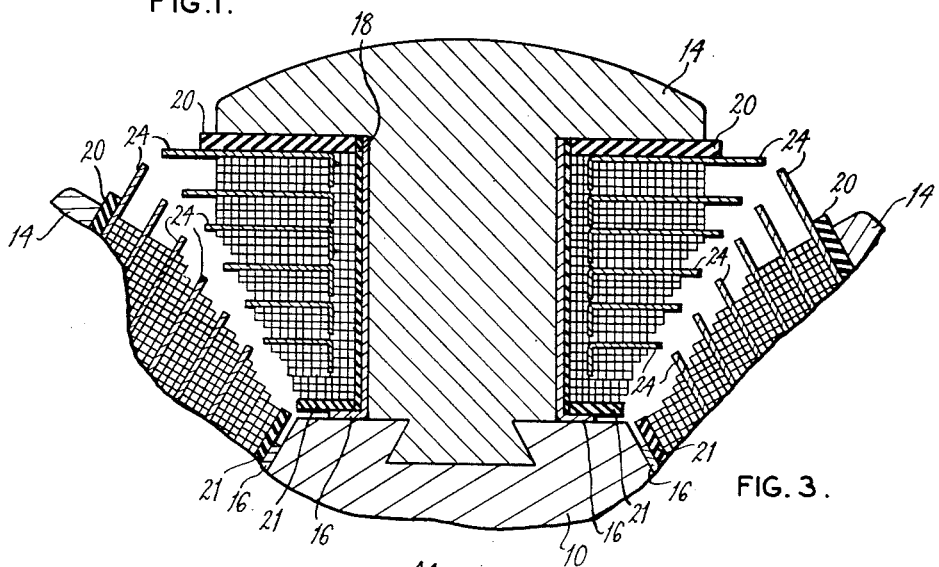
Figure 4:
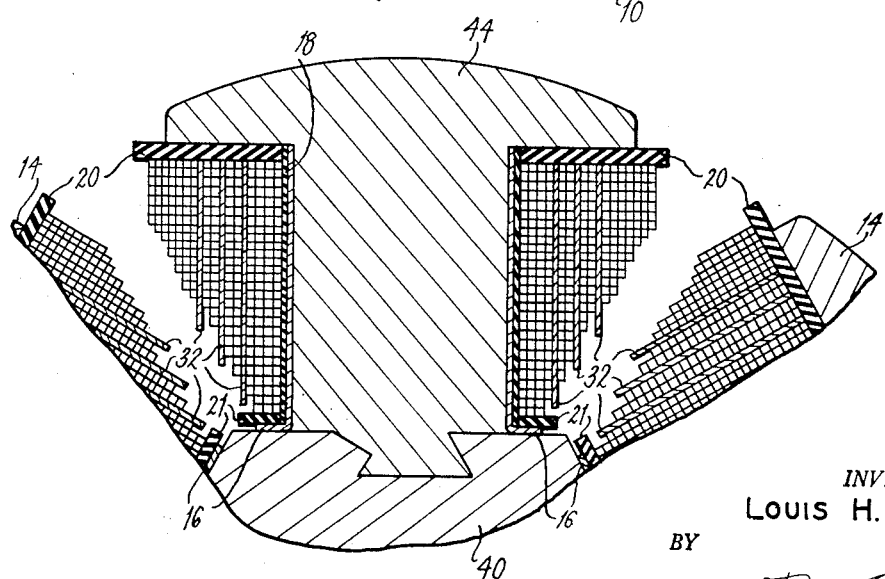

In the drawing,

Fig. 1 is a plan view of the rotor of a dynamoelectric machine that is made in accordance with the principles and teachings of the present invention, Fig. 2 is a perspective view of one form of heat radiating element or fin provided by the present invention, Fig. 3 is an enlarged view in cross section of the rotor of Fig. 1, and it is taken along the plane indicated by the line 3—3 in Fig. 1, and Fig. 4 is a cross sectional view through another rotor that is made in accordance with the principles and teachings of the present invention, and this other rotor uses a different type of heat radiating element or fin.

Referring to the drawing in detail, the numeral 10 denotes the hub of a rotor for a dynamoelectric machine. This hub has a polygonal periphery and it has a number of circumferentially spaced dovetailed recesses in the polygons on its faces. The dovetailed recesses of the hub 10 receive dovetailed projections on T-shaped sections 14 of the rotor. These T-shaped sections will be formed of a plurality of laminations suitably held together by welding or by bolts, not shown. The hub is provided with a shaft 12, and that shaft will be suitably mounted in bearings in a dynamoelectric machine.

A flanged plate 16 of metal is provided at each side of the stem of the T-shaped section 14, and the flange of that plate bears against the hub 10. The other end of the flanged plate 16 bears against the under side of the head of the T-shaped section 14. A plate 18 of insulation is placed against the outer face of each of the flanged plates 16, and the faces of the plates 16 and 18 will abut in intimate relation. A thicker plate of insulation 20 is placed against the under side of the head of the T-shaped section 14 and the inner edge of the plate 20 bears against the outer face of the plate 18. A smaller plate of insulation 21 is adjacent the flange on the metal plate 16 and the inner edge of the plate 21 bears against the outer surface of the plate 18. As indicated in the drawing, the T-shaped section 14 is elongated and is generally rectangular in plan view. Hence, the plates of insulation 18, 20 and 21 define a generally rectangular recess which receives ½ the winding for the T-shaped section 14. A similar recess is provided by other plates of insulation 18, 20 and 21 on the other side of the stem of the T-shaped section 14 and the second recess receives the other half of the winding for the T-shaped section. The winding is continuous and the turns in the two recesses are connected by portions of the windings which extend around the ends of the T-shaped section 14.

In forming the winding of Figs. 1 and 3, three layers of turns are wound in the recesses bounded by the plates of insulation 18, 20 and 21. Before the fourth layer is wound onto the T-shaped section 14, the uppermost heat radiating element or fin 24 is placed in engagement with the third layer. This heat radiating element has a body portion 26 and a foot 28 which extends transversely of the body portion 26. The foot of the heat radiating element 24 will be placed in engagement with the turns of the third layer and the body portion of that heat radiating element will be placed against the plate 20 of insulation. Thereafter, the turns of the fourth layer will be wound about the said heat radiating element and a corresponding heat radiating element 24 in the other recess on the T-shaped section 14. When the turns of the fourth layer have fully encased and enclosed the feet of the uppermost two heat radiating elements 24, another full turn for the fourth layer is wound onto the T-shaped section 14 and then two more heat radiating elements 24 are placed in contact with the third layer of turns. These heat radiating elements will have body portions 26 that are narrower than the two uppermost heat radiating element body portions. The second set of heat radiating elements 24 will be spaced out of engagement with the first set of heat radiating elements and thereafter the fourth layer of turns will be wound to confine and hold the feet of the second set of heat radiating elements. Once the layer of turns has completely covered and confined the feet of the second set of heat radiating elements, another full turn is taken and then the third set of heat radiating elements 24 is placed in engagement with the yet uncovered third layer of turns. The third set of heat radiating elements is spaced away from and out of engagement with the second set of heat radiating elements 24. The third set of heat radiating elements 24 is narrower than the second set of heat radiating elements. Thereafter, the fourth layer of turns is wound over the feet 28 of the third set of heat radiating elements, and the process is continued until the bottom of the recess defined by the plates 18, 20 and 21 is reached. Each succeeding set of heat radiating elements is narrower than the preceding set of elements and thus the lowermost set of heat radiating elements is the narrowest of all. The fifth layer of turns will then be wound between the body portions 26 of the various heat radiating elements 24 and will assist the fourth layer of turns in confining and holding the feet 28 of those heat radiating elements. The layers of turns on the T-shaped section 14 will not have the same longitudinal length, because the outermost layers will decrease in longitudinal length to provide a pyramidal configuration for the coil. When the coil is completed, the outer ends of the body portions 26 will project outwardly beyond the outermost layers of turns.

As emphasized particularly in Fig. 3, the layers of turns and the heat radiating elements of adjacent T-shaped sections 14 will coact to define air gaps. The air in those gaps will intimately engage the outer ends of the heat radiating elements 24 and will absorb heat from those outer ends. As the air absorbs heat from those outer ends of heat radiating elements, more heat will be transferred and conducted to those outer ends from the body portions 26 and from the feet 28 of those elements. This additional heat will also be transferred to the air.

The heat radiating elements 24 will preferably be coated with an electrically insulating varnish, as for example a Bakelite varnish. The various turns of wire will also be coated with a layer of insulation. Consequently, the metal of the conductors in the turns of the winding and the metal in the heat radiating elements should be electrically isolated from each other. If, through some defect in the insulation on the turns and on the heat radiating elements, one or more of the turns actually electrically engages the metal of one or more of the heat radiating elements, the entire coil will not be short circuited. Instead, only those turns which electrically engage the heat radiating element will be short circuited. In any event, the heat radiating fins cannot short circuit the winding to the core because those heat radiating elements are physically spaced from and are also electrically isolated from the core; both by the insulation on the turns of the winding and by the insulation on the heat radiating elements as well as by the plates of insulation 18, 20 and 21.

The feet 28 of the heat radiating elements 24 not only absorb heat from turns of the winding that are spaced longitudinally along the stem of the T-shaped section 14, but they also resist movement of the heat radiating elements outwardly from the turns of the winding. Thus those feet assist the turns of the winding in holding the heat radiating elements 24 in assembled position with the T-shaped sections 14.

In Fig. 4 a rotor hub 40, comparable to the rotor hub 10 of Fig. 3, is shown. That hub supports a number of circumferentially spaced T-shaped sections 44, and each of these sections is provided with two flanged plates 16 of metal and with two sets of plates of insulation 18, 20 and 21. The flanged plates 16 and the plates 18, 20 and 21 of Fig. 4 are comparable to and perform the same functions that are performed by the plates 16, 18, 20 and 21 of Fig. 3.

In forming the winding of Fig. 4, four layers of turns were wound in the recesses defined by the plates 18, 20 and 21. Thereafter, the innermost heat radiating elements 32 were placed in engagement with that fourth layer of turns. Thereafter, the fifth and sixth layers of turns were wound over the heat radiating elements 32. It will be noted that the fourth layer of turns was shorter than the first three layers of turns to define recesses only partially covered by the lower ends of the heat radiating elements 32. It will further be noted that the fifth and sixth layers of turns were shorter than the fourth layers of turns to expose the lower ends of the heat radiating elements 32. Once the fifth and sixth layers of turns had been formed, the next set of heat radiating elements 32 were placed in engagement with the sixth layer of turns. The lower end of the second set of heat radiating elements project below the lower ends of the sixth layers of turns and those heat radiating elements are held in position by the seventh and eighth layers of turns. The seventh layer of turns is appreciably shorter than the second set of heat radiating elements and the eighth layer of turns is even shorter than the seventh layer of turns. Once the eighth layer of turns has been completed, the final set of heat radiating elements 32 is placed in engagement with that eighth layer. Thereafter the ninth and succeeding layers of turns are wound onto the T-shaped section 14, and those layers of turns will confine the last set of heat radiating elements. The ninth and succeeding layers of turns are shorter than the last set of heat radiating elements to permit the lower ends of those heat radiating elements to be exposed. The heat radiating elements 32 are metal plates which are flat and which have their upper ends bearing against the plates 20 of insulation. The lower ends of those heat radiating elements 32 will, as explained previously, project below the layers of turns of the winding on the T-shaped section 44. These lower ends of the heat radiating elements 32 will extend into the air gap between the adjacent T-shaped sections of the rotor of the dynamoelectric machine and will dissipate heat to the air in that air gap. If desired, the elements 32 can be coated with a layer of insulation.

Where these heat radiating elements have been introduced into windings, they have reduced the overall temperature rise of the dynamoelectric machines by as much as twenty percent. For example, in one motor in which these heat radiating elements were inserted in the windings, the previous temperature rise of fifty degrees centigrade was reduced to forty degrees centigrade. This reduction in temperature rise was accomplished without any increase in the overall dimensions of the rotor.

While the drawing and accompanying description have shown the heat radiating elements applied to the rotor of a dynamoelectric machine, these heat radiating elements can be used in the stators of dynamoelectric machines. In each instance, it is desirable to space the heat radiating elements from each other and from the metal cores of the dynamoelectric machines.

Whereas the drawing and accompanying description have shown and described two preferred embodiments of the present invention, it should be apparent to those skilled in the art that various changes may be made in the form of the invention without affecting the scope thereof.

What I claim is:

1. A winding for a dynamoelectric machine that is mounted on a metal core and that comprises a plurality of turns mounted on and distributed along said core, a plurality of heat radiating elements that are of metal and that are disposed adjacent and bear against said turns, and a second plurality of turns mounted on and distributed along said core, said second plurality of turns overlying the first said plurality of turns and overlying and confining and supporting said heat radiating elements, said heat radiating elements extending outwardly beyond said second plurality of turns to dissipate heat from said first said and said second plurality of turns, said heat radiating elements being spaced from said core by said first said plurality of turns and being spaced from each other, said first said plurality of turns being insulated whereby said heat radiating elements are electrically isolated from said core.

2. A winding for a dynamoelectric machine that is mounted on a metal core and that comprises a plurality of turns mounted on and distributed along said core, a plurality of heat radiating elements, each of said heat radiating elements having an elongated body portion and a transversely extending foot, said feet of said heat radiating elements being disposed adjacent and bearing against said turns, and a second plurality of turns mounted on and distributed along said core, said second plurality of turns overlying the first said plurality of turns and overlying and confining and supporting said feet of said heat radiating elements, said body portion of said heat radiating elements extending outwardly beyond said second plurality of turns to dissipate heat from said first said and said second plurality of turns, said feet of said heat radiating elements being spaced from said core by said first said plurality of turns and being spaced from each other, said first said plurality of turns being insulated whereby said feet of said heat radiating elements are electrically isolated from said core.

3. A winding for a dynamoelectric machine that is mounted on a metal core and that comprises a plurality of turns mounted on and distributed along said core and a plurality of heat radiating elements of metal that are disposed within and confined and supported by said plurality of turns, said heat radiating elements being physically spaced and electrically insulated from said core from said core and being physically spaced and electrically insulated from each other, said turns being insulated, whereby said heat radiating elements are electrically isolated from said core and from each other.

4. A winding for a dynamoelectric machine that is mounted on a metal core and that comprises a plurality of turns mounted on and distributed along said core and a plurality of heat radiating elements disposed within and confined and supported by said plurality of turns, said heat radiating elements being physically spaced and electrically insulated from said core and being physically spaced and electrically insulated from each other, said turns being insulated, whereby said heat radiating elements are electrically isolated from said core and from each other, said heat radiating elements being L-shaped in configuration and having radially extending body portions and axially extending feet, said body portions of said heat radiating elements extending outwardly beyond said turns, said feet of said heat radiating elements being enclosed by said turns.

5. A winding for a dynamoelectric machine that is mounted on a T-shaped section of a metal rotor core and that comprises a plurality of turns, mounted on and distributed along the stem of said T-shaped section, insulation on the stem of said T-shaped section, and a plurality of heat radiating elements disposed within and confined and supported by said plurality of turns, said heat radiating elements extending transversely of said stem of said T-shaped section and being spaced longitudinally apart along the length of said T-shaped section, said heat radiating elements progressively decreasing in length from the head to the foot of said stem of said T-shaped section.

6. A winding for a dynamo-electric machine that is mounted on a T-shaped section of a metal rotor core and that comprises a plurality of turns mounted on and distributed along the stem of said T-shaped section, insulation on the underside of the head of said T-shaped section, and a plurality of heat radiating elements disposed within and confined and supported by said plurality of turns, said heat radiating elements extending longitudinally of said T-shaped section and being spaced transversely of said T-shaped section, said heat radiating elements having the upper ends thereof bearing against said insulation on the underside of the head of said T-shaped section and having the lower ends thereof extending out of said plurality of turns.

7. A winding for a dynamoelectric machine that is mounted on a T-shaped section of a metal rotor core and that comprises a plurality of turns mounted on and distributed along the stem of said T-shaped section, insulation on the underside of the head of said T-shaped section, and a plurality of heat radiating elements disposed within and confined and supported by said plurality of turns, said heat radiating elements extending longitudinally of said T-shaped section and being spaced transversely of said T-shaped section, said heat radiating elements having the upper ends thereof bearing against said insulation on the underside of the head of said T-shaped section and having the lower ends thereof extending out of said plurality of turns, said lower ends of said heat radiating elements being spaced at progressively greater distances from the center of said core as said heat radiating elements are spaced laterally from said stem of said T-shaped section.

References Cited in the file of this patent

UNITED STATES PATENTS

| | | |
|---|---|---|
| 412,352 | Winkler | Oct. 8, 1889 |
| 2,447,339 | Hoover | Aug. 17, 1948 |

FOREIGN PATENTS

| | | |
|---|---|---|
| 248,418 | Italy | May 19, 1926 |
| 588,078 | Germany | Nov. 13, 1933 |